Aug. 23, 1966  R. F. GIORDANO  3,267,788
SHEARING APPARATUS HAVING YIELDABLE WORK-STOP MEANS
Filed Aug. 5, 1965  5 Sheets-Sheet 2
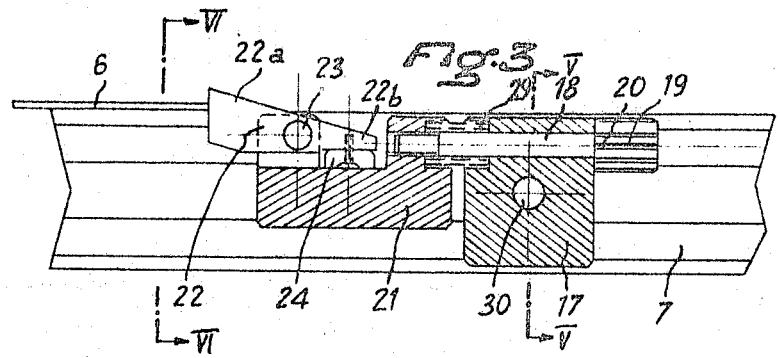
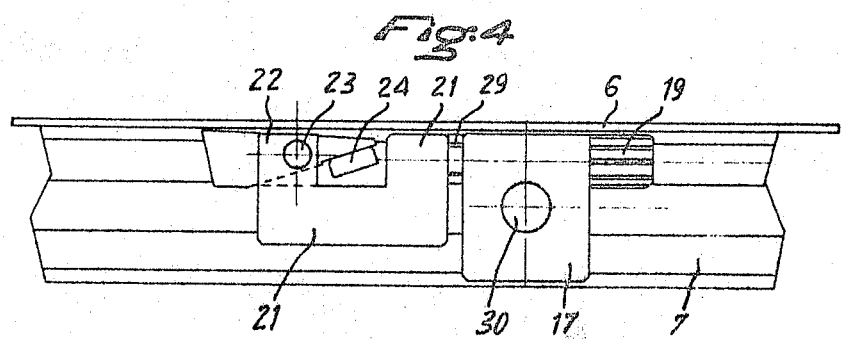
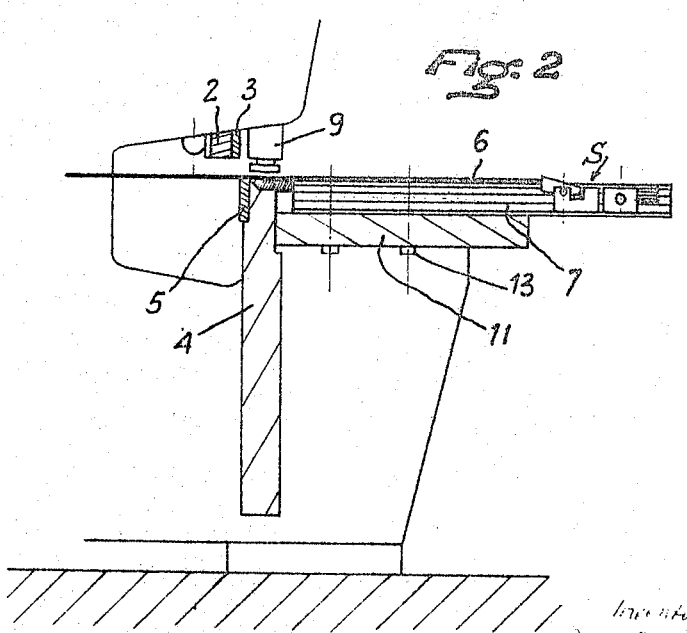
Inventor
Roger François Giordano
by Michael J. Striker
his Attorney

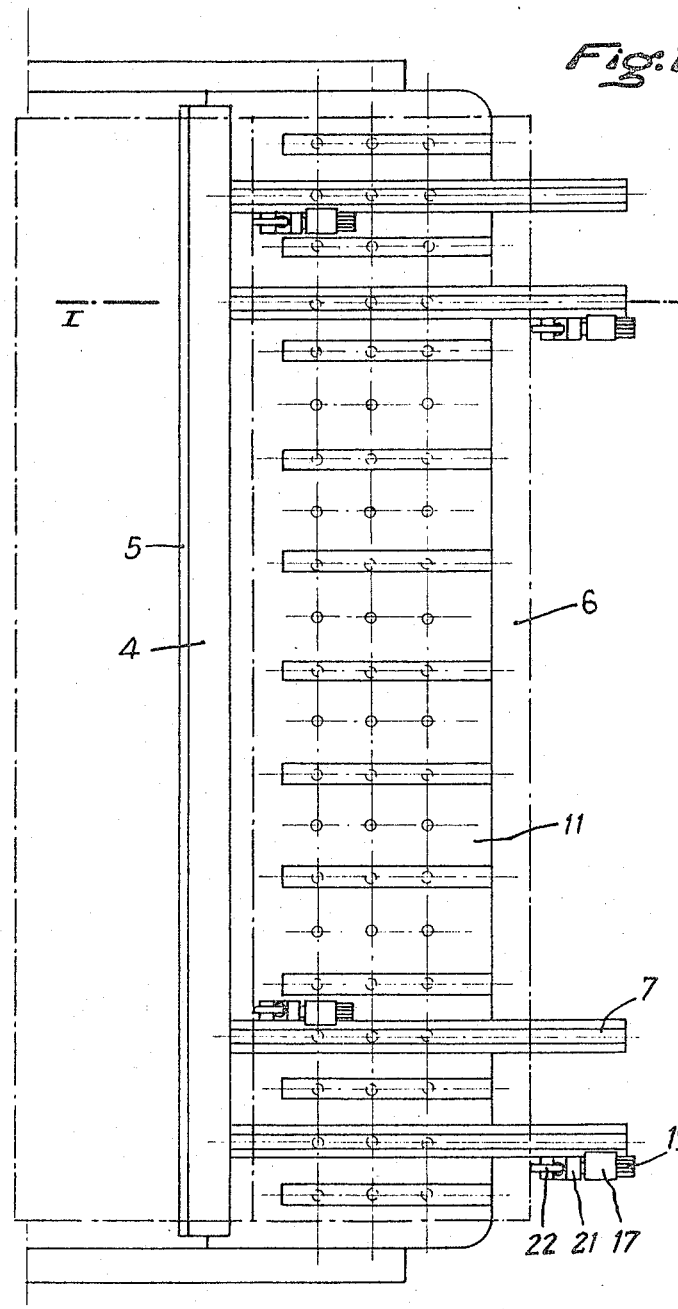

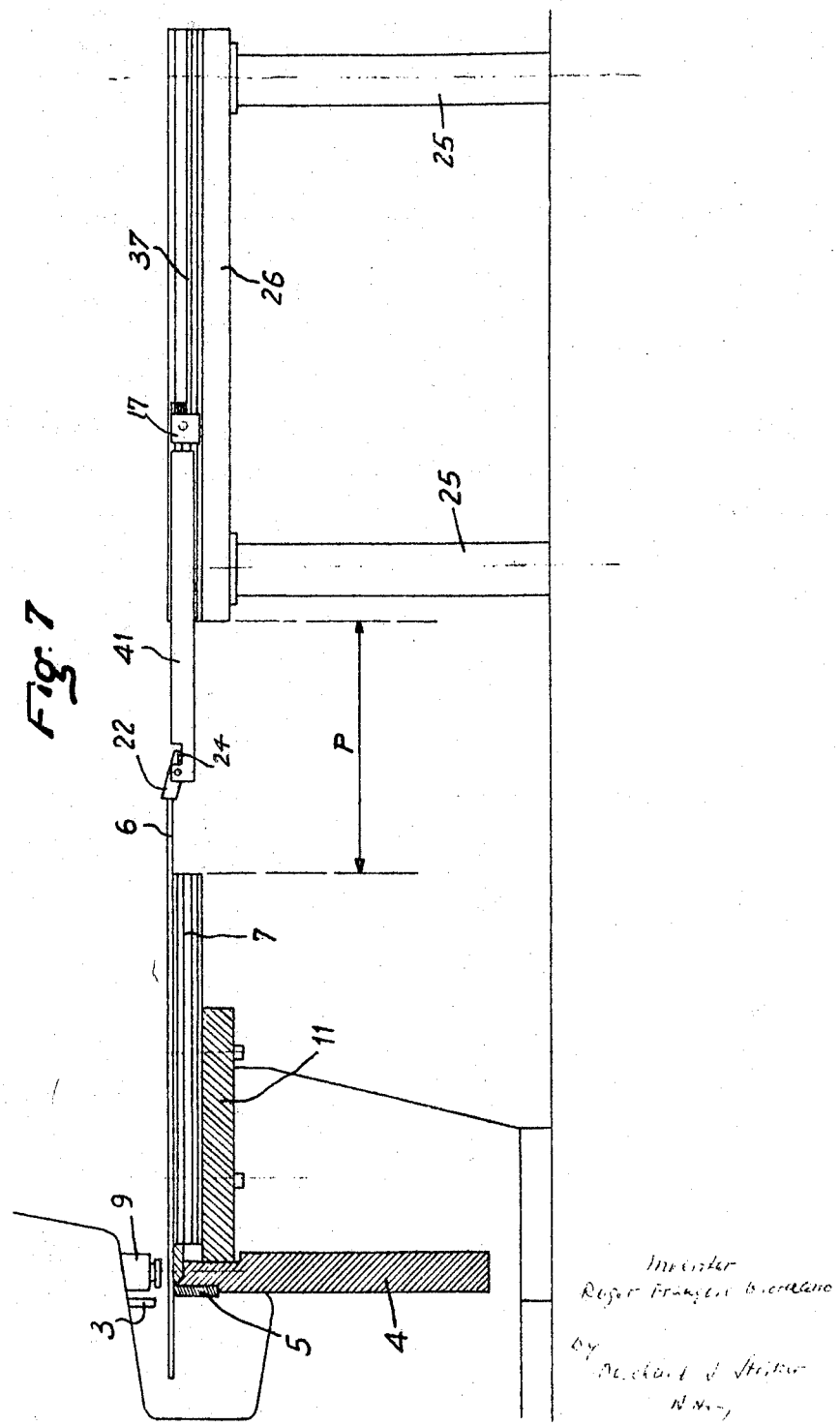

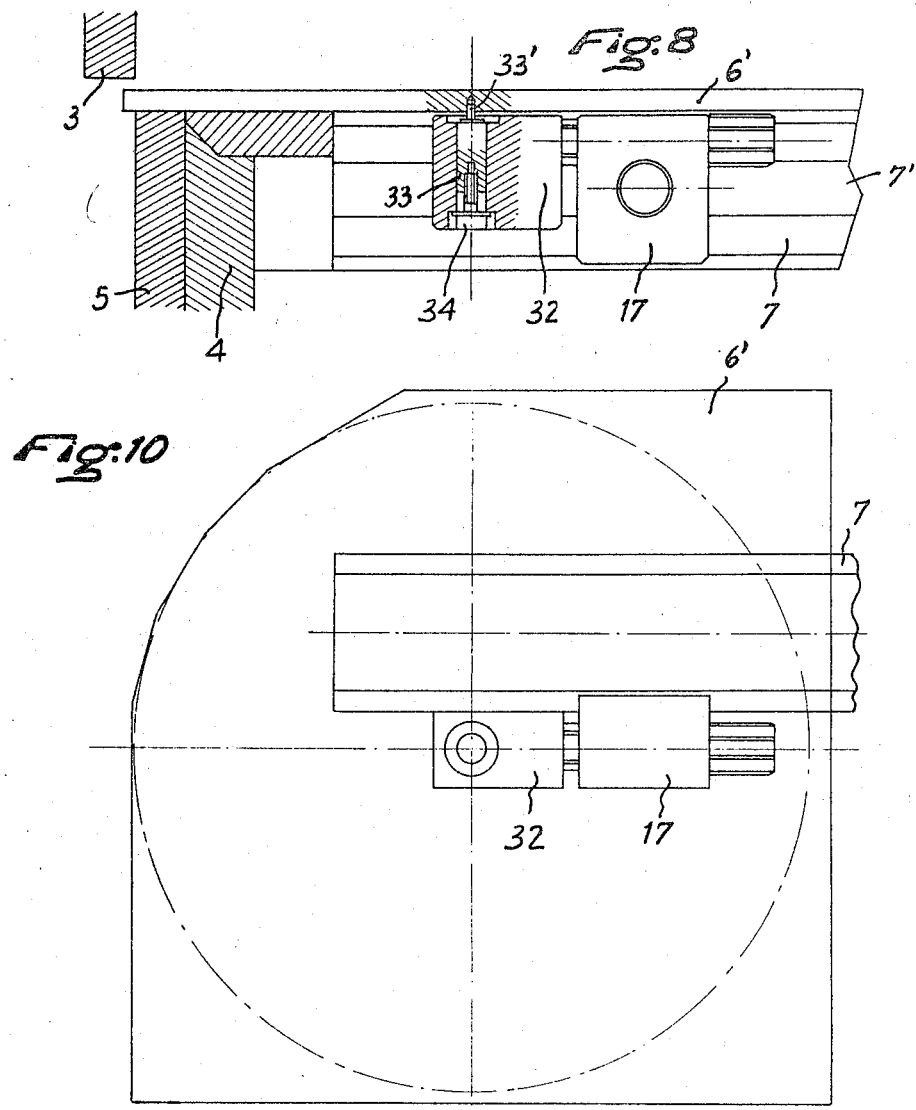

United States Patent Office 3,267,788
Patented August 23, 1966

3,267,788
SHEARING APPARATUS HAVING YIELDABLE
WORK-STOP MEANS
Roger François Giordano, 2 Rue Pasteur Deuil-la-Barre,
Seine et Oise, France
Filed Aug. 5, 1965, Ser. No. 477,380
Claims priority, application France, Feb. 17, 1965,
PV 5,888
13 Claims. (Cl. 83—467)

The present invention relates to shearing means, and more specifically to shearing means including stop or positioning means for positioning the edge of a plate or the like to be cut by the shearing means relative to the cutting edges of the shear blades.

Shearing apparatus is known in the art which includes stop or positioning means mounted on the support means of the apparatus at a fixed or at an adjustable position relative to the cutting edges of the shear blades so that an edge of the plate or the like to be cut may be properly positioned relative to the blades. During shearing of heavy material in such apparatus the cutting edge of the blade is forced in a direction transverse to the movement of the movable blade slightly away from the cutting edge of the stationary blade, and after the cutting edge of the movable blade has cut through the material it tends to snap back again into engagement with the stationary blade. Due to this snap back of the movable blade after the cutting operation has been performed, the cut off portion of the plate will be clamped tightly between the movable blade and the abutment face of the stop or positioning means, creating thereby considerable friction on the engaged face portions of the movable blade and the stop or positioning means, which will not only impede movement of the movable blade to the open position, but which also will cause considerable wear on the respective face portions of the movable blade and that of the stop or positioning means.

It is an object of the present invention to overcome this disadvantage of shearing apparatus known in the art.

It is an additional object of the present invention to provide stop or positioning means for a shearing apparatus of the aforementioned kind in which excessive stresses and resulting friction produced during the aforementioned snap back of the movable blade will be avoided.

It is a further object of the present invention to provide in a shearing apparatus of the aforementioned kind stop or positioning means by means of which the above mentioned advantageous results are obtained and which are constructed from relatively few and simple parts so as to be produceable at reasonable cost while standing up perfectly under extended use.

With these objects in view, the shearing means according to the present invention for shearing metal plates or the like mainly comprises support means, a pair of shear blades having each a cutting edge and in which one of the blades is stationary and the other movably mounted on the support means movable between an open position in which said cutting edges are spaced from each other so that a plate to be cut may be fed between the cutting edges and a cutting position in which the cutting edge of the movable blade cuts through the plate, and stop means on the support means and comprising a member fixed to the support means at a selected distance from the blades, engaging means spaced from the member and on the side of the latter facing the blades and constructed and arranged so as to engage the front edge of a plate fed between the blades in open position, connecting means connecting the engaging means to the member and being constructed and arranged to prevent movement of the engaging means away from the member beyond a predetermined distance while permitting movement of the engaging means towards the member, and prestressed spring means operatively connected to the engaging means and the aforementioned member and biased to maintain the engaging means spaced the predetermined distance from the member while permitting the engaging means to yield towards the member when a force is exerted by the front edge of the plate on the engaging means which is greater than the force developed by the prestressed spring means.

In this arrangement the engaging means of the stop means may yield, during the snap back of the movable blade after the cutting operation, against the force of the prestressed spring means and therefore the cut off portion of the plate will be clamped between the engaging means and the movable blade with a force developed by the prestressed spring means, which is considerably smaller than the force exerted by the snap back of the movable blade. The resulting friction on the face portions of the movable blade and the engaging means. as well as the wear of these face portions will thereby be considerably reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a top view of the shearing apparatus according to the present invention;

FIG. 2 is a partial sectional view taken along the line I—I of FIG. 1;

FIG. 3 is a sectioned side view of the stop means according to the present invention and drawn to an enlarged scale;

FIG. 4 is a side view similar to FIG. 3 and showing the stop means in another position;

FIG. 7 is a sectional side view similar to FIG. 2 and showing an arrangement for shearing especially large blades;

FIG. 8 is a partially sectioned side view similar to FIG. 3 and showing positioning means on the shearing apparatus for making a succession of cuts so as to cut a plate to substantially circular shape;

FIG. 9 is a partially sectioned partial view of a modification of the arrangement shown in FIG. 8; and FIG. 10 is a partial top view of the arrangement shown in FIG. 8.

Figure 5:
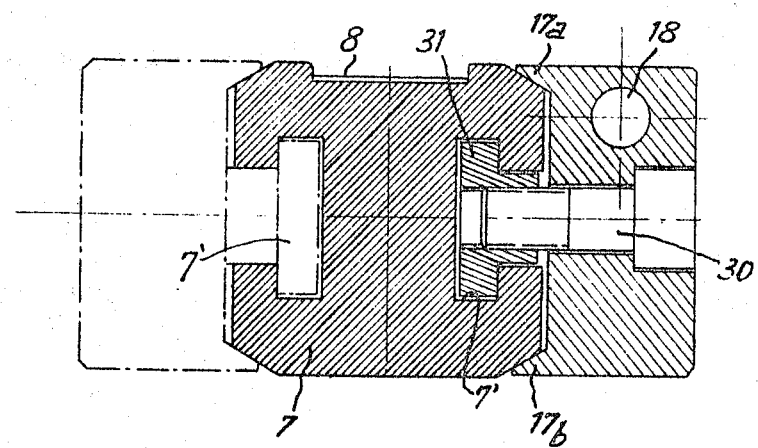
FIG. 5 is a sectional view taken along the line V—V of FIG. 3 and drawn to a further enlarged scale.

Referring now to the drawings, and more specifically to FIGS. 1–4 of the same, it will be seen that the shearing apparatus according to the present invention mainly comprises a lower stationary blade 4 mounted on a machine frame or support means only partly and schematically indicated in the drawings in fixed position and having an insert 5 preferably of high quality steel forming the cutting edge of the lower stationary blade 4. Cooperating with the lower stationary blade 4 is an upper blade 2 only partly and schematically indicated in FIG. 2 which is movably mounted on the machine frame movable between an upper position as shown in FIG. 2 in which the insert 3 forming the cutting edge of the movable blade 2 is upwardly spaced from the insert 5 of the stationary blade 4 so that a metal plate or the like 6 to be cut by the cutting apparaus may be fed between the blades in the open position thereof. The upper blade 2 is reciprocated by means well known in the art, not illustrated in the drawings between the open position shown in FIG. 2 and a cutting position in which the cutting edge of the movable blade cuts through the plate 6. The arrangement preferably includes a pressure member 9 of known construction which preferably moves downward ahead of the movable cutting blade 2 into engagement with the top surface of the plate 6 to be cut so as to prevent tilting of the latter during the cutting operation. The means for moving the pressure member 9 do not form part of the present invention and are therefore not illustrated.

The part of the plate 6 to be cut which extends through and beyond the cutting blades 2 and 4 is supported on the upper surface of a plurality of rails 7 which extend substantially normal to the plane in which the upper cutting blade 2 reciprocates substantially parallel to each other to one side of the aforementioned plane. The rails 7 are preferably supported and connected by screws 13 to a common support table 11 extending in a substantially horizontal plane and being integral or connected to in any suitable manner to the machine frame. A plurality of stop means S are mounted, in a manner as will be described in further detail later on, respectively on the rails 7 to engage a front edge of a plate 6 fed between the cutting blades 2 and 4 in the open position of the latter to position the front edge of the plate 6 at a selected distance from the cuting edges of the blades.

Each of the stop means S mainly comprises a member 17 adjustably mounted on the respective rail 7 in the manner as best shown in FIG. 5. Each of the rails 7 is formed with a pair of longitudinally extending substantially T-shaped grooves 7' respectively located on opposite sides of the respective rail 7 and a substantially T-shaped nut 31 is arranged in the respective groove 7' of the rail 7. The threaded bore of the nut 31 is engaged by the threaded portion of a screw 30 extending through a transverse bore of the member 17 so that the latter is held on one side of the respective rail 7 movable in longitudinal direction thereof, and so that the member 17 may be clamped in an adjusted selected position on the respective rail 7 by tightening the screw 30. The member 17 has preferably a pair of nose portions 17a and 17b guided on correspondingly chamfered edge portions of the rail 7 and tightly engaging these edge portions during tightening of the screw 30. Each of the rails 7 may also have on its top face thereof a scale having graduations 8 spaced in longitudinal direction of the rail from each other so that the position of the member 17 and the distance thereof from the cutting edges of the blades may be easily established. The stop means includes further engaging means comprising a first part 21 having a projecting portion 21' slidably received in the respective T-shaped slot 7' of the rail 7 and the part 21 is arranged slightly spaced from the member 17 and on the side of the latter facing the cutting blades of the apparatus. The engaging means include further a second part 22 pivotally mounted intermediate its ends by means of a pivot pin 23 on a pair of plate portions projecting upwardly from the front portion of the part 21. The part 22 is pivotally mounted on the part 21 movable between an active position as shown in FIG. 3 in which front face of the part 22 is located in the path of a plate 6 fed between the cutting edges of the blades 2 and 4 in the open position of the latter so that the front face of the part 22 will engage a front edge of the plate 6. The rear portion 22b of the part 22 of the engaging means carries fixed thereto by means of a screw or the like a small magnet 24 adapted to engage with the bottom face thereof a top face of the part 21 so as to hold the part 22 in the active position as shown in FIG. 3. The front portion 22a at the left side of the pivot pin 23, as viewed in FIG. 3, is heavier than the rear portion 22b and the small magnet 24 carried thereby so that the part 22 will tilt about the pivot pin 23 to the inactive position shown in FIG. 4 when the magnetic contact between the magnet and the part 21 is broken, and in the inactive position of the part 22 the front face thereof is located beneath the upper surface of the rail 7 so that the plate 6 may be pushed beyond the stop means.

The stop means S includes further connecting means comprising a screw 18 extending through a bore in the part 17 substantially parallel to the longitudinal direction of the rail 7 and the screw 18 has at one end thereof a head 19 engaging a face of the member 17 facing away from the blades, and on the other end a threaded portion threadingly engaged in a threaded bore of the part 21 so that the connecting means constituted by the screw 18 will prevent movement of the engaging means 21, 22 away from the member 17 beyond a predetermined distance while permitting movement of the engaging means toward the member 17. The screw head 19 may be provided on the periphery thereof with a plurality of spaced markings 20 cooperating with a marking, not shown in the drawing and provided on the face of the member 17 engaged by the screw head 19, so that by turning the screw about its axis the distance between the member 17 and the engaging means 21, 22 may be changed by turning the screw 18 about its axis whereby the position of the engaging means relative to the member 17 may be read by means of the markings 20. Instead of providing a screw 18 with a fixed head 19 and a threaded end on the other end thereof, the head 19 may be replaced by a nut threaded at a threaded end of the screw 18 projecting towards the right, as viewed in FIG. 3, whereas the other end of the screw is in this case fixedly connected to the part 21. Obviously, this construction permits also to adjust the distance between the member 17 and the part 21 and the adjusted distance may be read by means of corresponding markings provided on the periphery of the nut. The stop means includes further prestressed spring means 29 preferably constituted by a prestressed coil spring arranged about part of the screw 18 and abutting with opposite end faces thereof against end faces of a pair of cavities concentric with the axis of the screw 18 and respectively formed in portions of the member 17 and the part 21 facing each other.

The above described arrangement will operate as follows. A plate 6 to be cut by the shearing means is fed between the shearing blades 2 and 4 when the latter are in the open position as shown in FIG. 2 until the front edge of the plate 6 abuts against the front face of the part 22 as shown in FIG. 3 to place thereby the front edge of the plate 6 at a selected distance from the cutting edges of the blades 2 and 4. The movable shearing blade 2 is then operated in a known manner to move in downward direction relative to the stationary blade 4 so that the cutting edge of the movable blade 2 will cut through the plate 6. During this cutting operation, the cutting pressure will force the cutting edge of the movable plate 2 a slight distance away in a direction transverse to the direction of movement of the blade 2 from the cutting edge of the stationary blade 4, and after the plate 6 has been cut through, the movable blade 2 will snap back into engagement with the front face of the stationary blade 4. During this snap back of the movable cutting blade 2 the cut off portion of the plate 6 will be moved towards the right, as viewed in FIG. 2, and thereby push the engaging means 21, 22 likewise towards the right to compress thereby the prestressed spring means 29. The cut off portion of the plate 6 will thereby be clamped between a face portion of the movable blade 2 and the front face of the part 22 of the engaging means with a clamping pressure which is equal to the pressure exerted by the further compressed spring 29, and which is considerably smaller than a clamping pressure which would be developed by the snap back of the movable plate in an arrangement in which the front edge of the plate is engaged by stop means unyieldably fixed to the rail.

Figure 6:
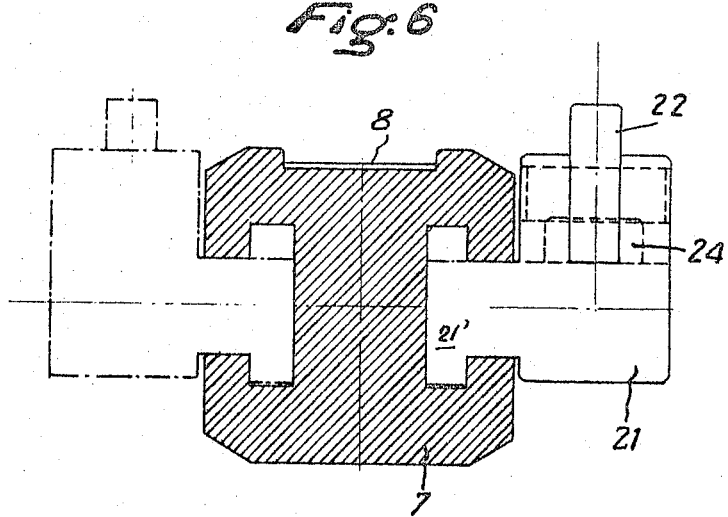
FIG. 6 is a sectional view similar to FIG. 5 taken along the line VI—VI of FIG. 3 and drawn at the same scale as FIG. 5.

If plate portions of considerable length have to be cut in the shearing apparatus of the present invention, the shearing apparatus of the present invention may also include additional support means arranged spaced from the above described rails 7. Such an arrangement is schematically illustrated in FIG. 7. The additional support means include a table having a top plate 26 and a plurality of legs or columns 25 supporting the table plate 26 on the upper ends thereof and a plurality of rails 37 mounted on the top plate 26 respectively aligned with the aforementioned described rails 7 and spaced a distance P from the rear or right ends, as viewed in FIG. 7 of the rails 7. The rails 37 have preferably substantially the same profile as shown in FIGS. 5 and 6 for the rails 7 and each of the rails 37 carries at least one stop means including a member 17 constructed and fastened to the respective rail 37 in the manner as described before in connection with FIG. 5. In the stop means mounted on the rail 37 the part 21 of the engaging means is however replaced by an elongated member 41 which differs from the part 21 only by the greater length thereof. The elongated part 41 is otherwise constructed and arranged in the same manner as the part 21 of the engaging means shown in FIGS. 3 and 4 and the elongated part 41 carries at its front portion thereof a pivotal part 22 constructed and arranged relative to the elongated part 41 in exactly the same manner as described in connection with FIGS. 3 and 4. The part 22 has also attached thereto a small magnet 24 only schematically shown in FIG. 7 which cooperates with the other components of the stop means in the manner as described before. It is understood that the stop means mounted on the rail 37 include also connecting means in the form of a screw 18 and prestressed spring means 29 in the manner and for the purpose as described in connection with FIGS. 3 and 4.

If a plate portion longer than the length of the rails 7 has to be cut by the shearing apparatus illustrated in FIG. 7 the member 17 of the stop means may be adjusted and fixed to the respective rail 37 for instance in the position as shown in FIG. 7 in which the elongated part 41 partly bridges the gap between the rear ends of the rails 7 and the front ends of the rails 37. Obviously, the member 17 may be adjusted along the respective rail 37 and fixed to the rail at any position along the length thereof. If short portions have to be cut from a plate 6, the member 17 is moved towards the right, as viewed in FIG. 7, so that the front face of the member 22 is withdrawn towards the right, as viewed in FIG. 7, so as not to protude beyond the left edge, as viewed in FIG. 7 of the respective rail 7 and so that an operator may handle the cut off portion in the gap P between the rails 7 and 37. Obviously, during such an operation appropriate stop means are mounted on the rails 7 and in fact these stop means can be left on the rails 7 and be simply turned to the inoperative position during cutting of long plate portions in the apparatus.

The apparatus of the present invention may also be used for cutting a plate 6' by a plurality of successive cuts into substantially circular shape and the arrangement for such a cutting arrangement is schematically illustrated in FIGS. 8-10. In this arrangement the parts 21-24 of the engaging means described in connection with FIGS. 3 and 4 are replaced by a part 32 as shown in FIG. 8 which is aragned adjacent and spaced from a member 17 constructed and arranged on the rail 7 in the same manner as described in connection with FIGS. 3 and 4. The member 32 has a projecting portion similar to the projecting portion 21' of the member 21 which is slidably guided in the T-shaped slot 7' of the rail 7. The member 32 is formed with a vertically extending bore 36 therethrough which tapers slightly in downward direction and a correspondingly tapered pin 33 is located in the bore and held therein by means of a screw 34 as shown in FIG. 8. The pin 33 has a portion 33' of smaller diameter projecting from the top face of the pin 33 axially aligned therewith and engaging in a small blind bore formed in the plate 6' to be cut. It is understood that the stop or positioning means shown in FIG. 8 includes also connecting means in the form of a screw 18 connecting the member 32 to the member 17 in the same manner as the part 21 of the engaging means shown in FIG. 3 is connected to the member 17 and also prestressed spring means 29 in engagement with and cooperating with the members 32 and 17 in the manner as described in connection with FIGS. 3 and 4. In fact the same member 17 with its screw 18 and the prestressed coil spring 29 may be used either in combination with the engaging means 21-24 shown in FIGS. 3 and 4 or in connection with the member 32 shown in FIG. 8 and either the part 21 shown in FIG. 3 or the member 32 shown in FIG. 8 may be selectively connected by the connecting means constituted by the screw 18 to the member 17 so that the shearing apparatus of the present invention may be changed from one mode of operation in which successive plate portions having parallel edges are cut off from an elongated plate by using the stop means as illustrated in FIGS. 3 or 4 or in which successive cuts are angularly displaced from each other as indicated in FIG. 10 by mounting a plate turnable on the pin portion 33' and by turning the plate after each successive cut through a small angle about the axis of the pin portion 33'.

If forming of a small bore in the plate 6' adapted to be located on the pin portion 33' as shown in FIG. 8 is objectionable, the arrangement illustrated in FIG. 8 may also be changed by removing the pin 33 therefrom and by fixedly attaching, for instance by welding, a small pin 35 to the bottom surface of the plate 6' as shown in FIG. 9 which is centered in the bore 36 of the member 32.

It will be understood that each of the elements described above, or two or more together, may also find a useful application in other types of shearing apparatus differing from the types described above.

While the invention has been illustrated and described as embodied in a shearing apparatus having stop means with yieldable engaging means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Shearing means for shearing metal plates or the like comprising, in combination, support means; a pair of shear blades having each a cutting edge, one of said blades being stationarily and the other movably mounted on said support means movable between an open position in which said cutting edges are spaced from each other so that a plate to be cut may be fed between said cutting edges and a cutting position in which the cutting edge of the movable blade cuts through the plate; and stop means on said support means and comprising a member fixed to said support means at a selected distance from said cutting edges of said blades, engaging means spaced from said member and on the side of the latter facing said blades and constructed and arrange so as to engage the front edge of a plate fed between said blades in open position, connecting means connecting said engaging means to said member and being constructed and arranged to prevent movement of said engaging means away from said member beyond a predetermined distance while permitting movement of said engaging means toward said member, and prestressed spring means operatively connected to said engaging means and said member and biased to maintain said engaging means spaced said predetermined distance from said member in a stopping position determining the distance of the front edge of the plate from said cutting edges of said blades while permitting said engaging means to yield toward said member when during cutting of the cutting edge of said movable blade through said plate a force is exerted by said front edge of the plate on said engaging means which is greater than the force developed by said prestressed spring means, whereby the force exerted by the cut edge of the plate on said movable blade will be reduced substantially to the force of the compressed spring means.

2. Shearing means for shearing metal plates or the like comprising, in combination, support means; a pair of shear blades having each a cutting edge, one of said blades being stationarily and the other movably mounted on said support means movable between an open position in which said cutting edges are spaced from each other so that a plate to be cut may be fed between said cutting edges and a cutting position in which the cutting edge of the movable blade cuts through the plate; and stop means on said support means and comprising a member adjustably mounted on said support means movable toward and away from said blades, fastening means for fastening said member at a selected distance from said blades to said support means, engaging means spaced from said member and on the side of the latter facing said blades and constructed and arranged so as to engage the front edge of a plate fed between said blades in open position, connecting means connecting said engaging means to said member and being constructed and arranged to prevent movement of said engaging means away from said member beyond a predetermined distance while permitting movement of said engaging means toward said member, and prestressed spring means operatively connected to said engaging means and said member and biased to maintain said engaging means spaced said predetermined distance from said member in a stopping position determining the distance of the front edge of the plate from said cutting edges of said blades while permitting said engaging means to yield toward said member when during cutting of the cutting edge of said movable blade through said plate a force is exerted by said front edge of the plate on said engaging means which is greater than the force developed by said prestressed spring means, whereby the force exerted by the cut edge of the plate on said movable blade will be reduced substantially to the force of the compressed spring means.

3. Shearing means for shearing metal plates or the like comprising, in combination, support means; a pair of shear blades having each a cutting edge, one of said blades being stationarily and the other movably mounted on said support means movable between an open position in which said cutting edges are spaced from each other so that a plate to be cut may be fed in one direction between said cutting edges and a cutting position in which the cutting edge of the movable blade cuts through the plate; at least one rail forming part of said support means and extending transverse to and in said one direction away from said blades; and stop means on said support means and comprising a member slidably mounted on said rail movable toward and away from said blades, fastening means for fastening said member at a selected distance from said blades to said rail, engaging means slidably mounted on said rail spaced from said member and on the side of the latter facing said blades and constructed and arranged so as to engage the front edge of a plate fed between said blades in open position, connecting means connecting said engaging means to said member and being constructed and arranged to prevent movement of said engaging means away from said member beyond a predetermined distance while permitting movement of said engaging means toward said member, and prestressed spring means operatively connected to said engaging means and said member and biased to maintain said engaging means spaced said predetermined distance from said member in a stopping position determining the distance of the front edge of the plate from said cutting edges of said blades while permitting said engaging means to yield toward said member when during cutting of the cutting edge of said movable blade through said plate a force is exerted by said front edge of the plate on said engaging means which is greater than the force developed by said prestressed spring means, whereby the force exerted by the cut edge of the plate on said movable blade will be reduced substantially to the force of the compressed spring means.

4. Shearing means for shearing metal plates or the like comprising, in combination, support means; a pair of shear blades having each a cutting edge, one of said blades being stationarily and the other movably mounted on said support means movable between an open position in which said cutting edges are spaced from each other so that a plate to be cut may be fed between said cutting edges and a cutting position in which the cutting edge of the movable blade cuts through the plate; and stop means on said support means and comprising a member adjustably mounted on said support means movable toward and away from said blades, fastening means for fastening said member at a selected distance from said blades to said support means, engaging means spaced from said member and on the side of the latter facing said blades and constructed and arranged so as to engage the front edge of a plate fed between said blades in open position, connecting means adjustably connecting said engaging means to said member and being constructed and arranged to prevent movement of said engaging means away from said member beyond an adjusted distance while permitting movement of said engaging means toward said member, and prestressed spring means operatively connected to said engaging means and said member and biased to maintain said engaging means spaced said predetermined distance from said member in a stopping position determining the distance of the front edge of the plate from said cutting edges of said blades while permitting said engaging means to yield toward said member when during cutting of the cutting edge of said movable blade through said plate a force is exerted by said front edge of the plate on said engaging means which is greater than the force developed by said prestressed spring means, whereby the force exerted by the cut edge of the plate on said movable blade will be reduced substantially to the force of the compressed spring means.

5. Shearing means for shearing metal plates or the like comprising, in combination, support means; a pair of shear blades having each a cutting edge, one of said blades being stationarily and the other movably mounted on said support means movable between an open position in which said cutting edges are spaced from each other so that a plate to be cut may be fed between said cutting edges and a cutting position in which the cutting edge of the movable blade cuts through the plate; and stop means on said support means and comprising a member adjustably mounted on said support means movable toward and away from said blades, fastening means for fastening said member at a selected distance from said blades to said support means, engaging means spaced from said member and on the side of the latter facing said blades and constructed and arranged so as to engage the front edge of a plate fed between said blades in open position, said engaging means comprising a first part, and a second part having an engaging face and being mounted on said first part for movement between an active position in which said engaging face is located in the path of the front edge of the plate fed between said blades in open position and an inactive position, said second part arranged on said first part tending to move to said inactive position, connecting means connecting said engaging means to said member and being constructed and arranged to prevent movement of said engaging means away from said member beyond a predetermined distance while permitting movement of said engaging means toward said member, and prestressed spring means operatively connected to said engaging means and said member and biased to maintain said engaging means spaced said predetermined distance from said member in a stopping position determining the distance of the front edge of the plate from said cutting edges of said blades while permitting said engaging means to yield toward said member when during cutting of the cutting edge of said movable blade through said plate a force is exerted by said front edge of the plate on said engaging means which is greater than the force developed by said prestressed spring means, whereby the force exerted by the cut edge of the plate on said movable blade will be reduced substantially to the force of the compressed spring means.

6. Shearing means for shearing metal plates or the like comprising, in combination, support means; a pair of shear blades having each a cutting edge, one of said blades being stationarily and the other movably mounted on said support means movable between an open position in which said cutting edges are spaced from each other so that a plate to be cut may be fed between said cutting edges and a cutting position in which the cutting edge of the movable blade cuts through the plate; and stop means on said support means and comprising a member adjustably mounted on said support means movable toward and away from said blades, fastening means for fastening said member at a selected distance from said blades to said support means, engaging means spaced from said member and on the side of the latter facing said blades and constructed and arranged so as to engage the front edge of a plate fed between said blades in open position, said engaging means comprising a first part, a second part having an engaging face and being mounted on said first part for movement between an active position in which said engaging face is located in the path of the front edge of the plate fed between said blades in open position and an inactive position, and means cooperating with said second part for releasably maintaining the latter in said active position, said second part arranged on said first part so as to move when released to said inactive position, connecting means connecting said engaging means to said member and being constructed and arranged to prevent movement of said engaging means away from said member beyond a predetermined distance while permitting movement of said engaging means toward said member, and prestressed spring means operatively connected to said engaging means and said member and biased to maintain said engaging means spaced said predetermined distance from said member in a stopping position determining the distance of the front edge of the plate from said cutting edges of said blades while permitting said engaging means to yield toward said member when during cutting of the cutting edge of said movable blade through said plate a force is exerted by said front edge of the plate on said engaging means which is greater than the force developed by said prestressed spring means, whereby the force exerted by the cut edge of the plate on said movable blade will be reduced substantially to the force of the compressed spring means.

7. Shearing means for shearing metal plates or the like comprising, in combination, support means; a pair of shear blades having each a cutting edge, one of said blades being stationarily and the other movably mounted on said support means movable between an open position in which said cutting edges are spaced from each other so that a plate to be cut may be fed between said cutting edges and a cutting position in which the cutting edge of the movable blade cuts through the plate; and stop means on said support means and comprising a member adjustably mounted on said support means movable toward and away from said blades, fastening means for fastening said member at a selected distance from said blades to said support means, engaging means spaced from said member and on the side of the latter facing said blades and constructed and arranged so as to engage the front edge of a plate fed between said blades in open position, said engaging means comprising a first part, a second part having an engaging face and being mounted on said first part for movement between an active position in which said engaging face is located in the path of the front edge of the plate fed between said blades in open position and an inactive position, and magnetic means cooperating with said second part for releasably maintaining the latter in said active position, said second part arranged on said first part so as to move when released to said inactive position, connecting means connecting said engaging means to said member and being constructed and arranged to prevent movement of said engaging means away from said member beyond a predetermined distance while permitting movement of said engaging means toward said member, and prestressed spring means operatively connected to said engaging means and said member and biased to maintain said engaging means spaced said predetermined distance from said member while permitting said engaging means to yield toward said member when a force is exerted by said front edge of the plate on said engaging means which is greater than the force developed by said prestressed spring means.

8. Shearing means for shearing metal plates or the like comprising, in combination, support means; a pair of shear blades having each a cutting edge, one of said blades being stationarily and the other movably mounted on said support means movable between an open position in which said cutting edges are spaced from each other so that a plate to be cut may be fed between said cutting edges and a cutting position in which the cutting edge of the movable blade cuts through the plate; and stop means on said support means and comprising a member adjustably mounted on said support means movable toward and away from said blades, fastening means for fastening said member at a selected distance from said blades to said support means, engaging means spaced from said member and on the side of the latter facing said blades and constructed and arranged so as to engage the front edge of a plate fed between said blades in open position, said engaging means comprising a first part, a second part pivotally mounted between the ends thereof on said first part for movement between an active and an inactive position, said second part having at one end thereof facing said blades an engaging face located in said active position of said second part in the path of the front edge of a plate fed between said blades in open position, and magnetic means mounted on said second part in the region of the other end thereof and being in magnetic contact with said first part when said second part is in said active position so as to releasably maintain said second part in said active position, said second part constructed and arranged on said first part so as to move to said inactive position when said magnetic contact is broken, connecting means connecting said engaging means to said member and being constructed and arranged to prevent movement of said engaging means away from said member beyond a predetermined distance while permitting movement of said engaging means toward said member, and prestressed spring means operatively connected to said engaging means and said member and biased to maintain said engaging means spaced said predetermined distance from said member while permitting said engaging means to yield toward said member when a force is exerted by said front edge of the plate on said engaging means which is greater than the force developed by said prestressed spring means.

9. Shearing means for shearing metal plates or the like comprising, in combination, support means; a pair of shear blades having each a cutting edge, one of said blades being stationarily and the other movably mounted on said support means movable between an open position in which said cutting edges are spaced from each other so that a plate to be cut may be fed between said cutting edges and a cutting position in which the cutting edge of the movable blade cuts through the plate; and stop means on said support means and comprising a member fixed to said support means at a selected distance from said cutting edges of said blades, said member being formed with a bore therethrough extending substantially normal to said blades, engaging means spaced from said member and on the side of the latter facing said blades and constructed and arranged so as to engage the front edge of a plate fed between said blades in open position, said engaging means being formed with a threaded bore therethrough aligned with said bore in said member, connecting means connecting said engaging means to said member and comprising a screw slidably guided in said bore of said member and having at one end thereof a head engaging said member on a side thereof facing away from said blades and a threaded portion threadingly engaged in said threaded bore of said engaging means so as to prevent movement of said engaging means away from said member beyond a predetermined distance which is adjustable by threading said threaded portion of said screw in and out of said threaded bore while permitting movement of said engaging means toward said member, and prestressed spring means operatively connected to said engaging means and said member and biased to maintain said engaging means spaced said predetermined distance from said member in a stopping position determining the distance of the front edge of the plate from said cutting edges of said blades while permitting said engaging means to yield toward said member when during cutting of the cutting edge of said movable blade through said plate a force is exerted by said front edge of the plate on said engaging means which is greater than the force developed by said prestressed spring means, whereby the force exerted by the cut edge of the plate on said movable blade will be reduced substantially to the force of the compressed spring means.

10. Shearing means as set forth in claim 1, wherein said support means includes a plurality of substantially parallel rails projecting substantially normal to said blades to one side of the latter, and including a pair of stop means mounted on each rail.

11. Shearing means as set forth in claim 10, wherein said blades are arranged in a substantially vertical plane with the stationary blade arranged as the lower one of said pair of blades, and wherein each of said rails has a top face arranged substantially in a common horizontal plane with the cutting edge of said lower blade.

12. Shearing means as set forth in claim 11, wherein said support means includes a second plurality of rails arranged spaced in longitudinal direction from the first mentioned plurality of rails at said one side of said blades, and including a plurality of stop means respectively mounted on said second plurality of rails.

13. Shearing means as set forth in claim 11, wherein said plurailty of rails are mounted on a common support table forming part of said support means.

References Cited by the Examiner
UNITED STATES PATENTS

| | | | |
|---|---|---|---|
| 1,012,805 | 12/1911 | Bryen | 83—467 |
| 2,189,086 | 2/1940 | Seagren | 83—467 |
| 2,572,137 | 10/1951 | Grieder | 83—467 X |
| 2,589,033 | 3/1952 | Baumgartner | 83—467 |
| 2,999,409 | 9/1961 | Gollwitzer | 83—467 X |
| 3,039,344 | 6/1962 | Hercik | 83—165 |

WILLIAM W. DYER, Jr., *Primary Examiner.*

F. T. YOST, J. M. MEISTER, *Assistant Examiners.*